Dec. 31, 1940.  E. R. KNOWLES  2,227,263
INJECTION MOLDING DEVICE
Filed April 20, 1938
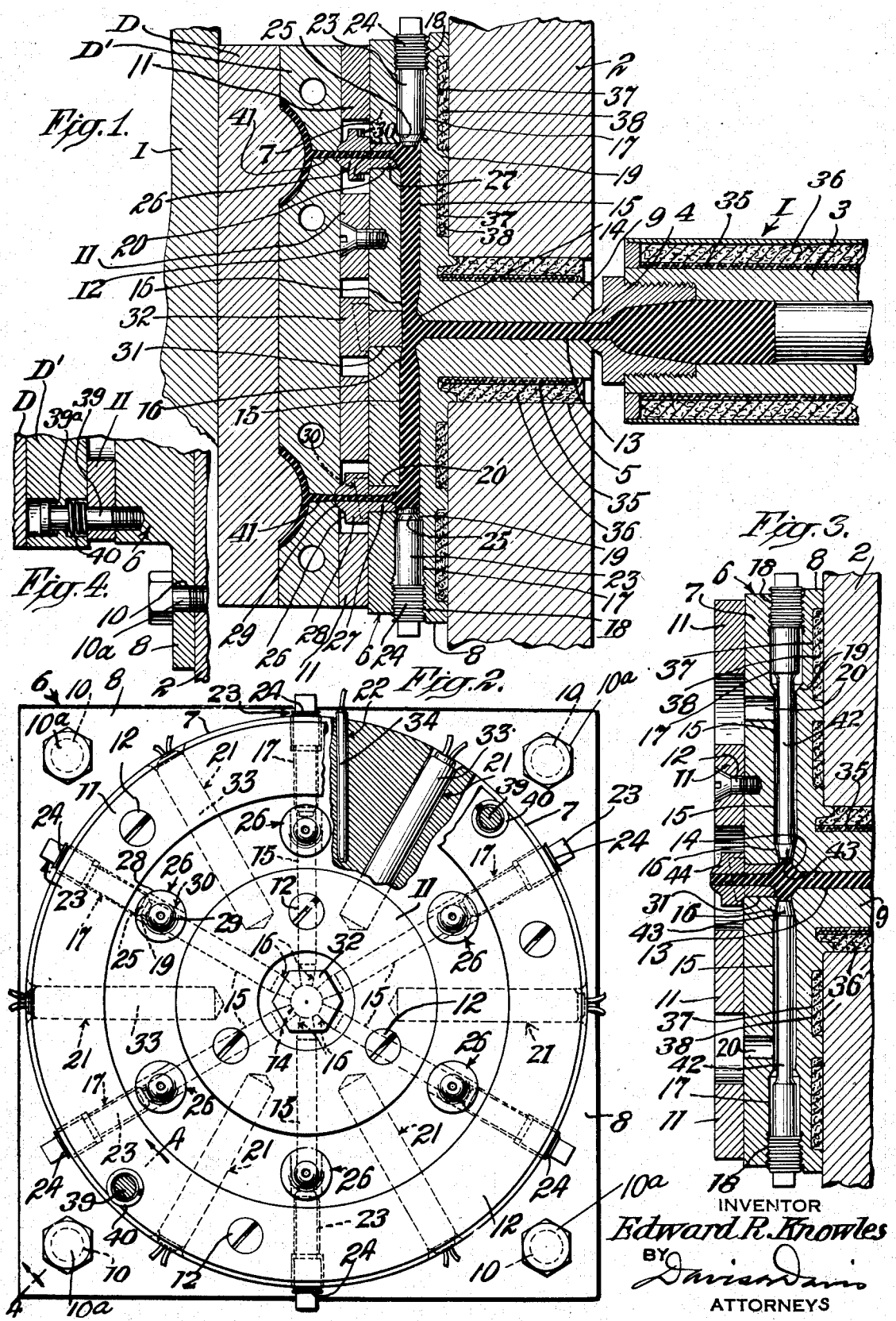
INVENTOR
Edward R. Knowles
BY
ATTORNEYS Patented Dec. 31, 1940

2,227,263

UNITED STATES PATENT OFFICE 2,227,263

INJECTION MOLDING DEVICE

Edward R. Knowles, Bridgeport, Conn., assignor to The Watson-Stillman Co., Roselle, N. J., a corporation of New Jersey Application April 20, 1938, Serial No. 203,219

10 Claims. (Cl. 18—30)

In injecting molding of thermoplastic materials it is common to mold a multiplicity of small articles by one operation. For that purpose there is employed a sectional mold having a multiplicity of mold cavities and a multiplicity of "runner" channels radiating from the gate, or entrance port, of the mold and leading to the various cavities. A charge of thermoplastic material injected into the gate is distributed to the mold cavities by the runner channels. As said channels are contained in the chilled mold consequent rapid chilling of the material as it flows through the channels impedes charging of the mold cavities. After charging of the cavities, material remaining in the gate and in the runner channels hardens and forms a spider-like sprue connecting all of the molded articles and molded to them. After ejection of the said articles and the sprue as a unit from the mold the sprue is cut off and ground up for subsequent molding use.

Important objects of the present invention are, to provide for elimination of the said chilled runner channels in multiple injection molding and thereby avoid consequent impedance to the charging of the mold cavities and also eliminate the sprue connecting the molded articles, and to provide an improved injection device for accomplishing that purpose.

Other objects of the invention will appear hereinafter.

In the drawing, Fig. 1 is a vertical central sectional view of the injection device associated with a conventional form of injector and with a multiple-cavity mold;

Fig. 2 is a front face view of the device partly in section;

Fig. 3 is a vertical central sectional view of the device showing it adjusted to reduce the number of injection points; and Fig. 4 is a detail section on the line 4—4 of Fig. 2.

A standard form of injection molding machine for molding a thermoplastic material, such as cellulose acetate, for example, includes a pair of opposed mold-backing abutment plates and an injector all mounted upon a base frame. Companion molding dies are borne respectively by said abutment plates. One of the latter is a resistance member usually held in a fixed position or having a limited movement and the other is a pressure transmitting member reciprocable toward and from the resistance plate to close and open the sectional mold. The injector usually projects through a central aperture in the resistance abutment plate and has a nozzle for injection into a single mold gate, in the die borne by said plate. When the mold has a number of cavities for multiple molding the companion dies are formed at their parting surfaces to define the runner channels leading from the gate to the different cavities to distribute to the latter the charge injected through the gate.

The mold is chilled by circulation of water through channels in the dies. Since the runner channels are directly in the middle of the sectional mold the material passing through said channels is subjected to a chilling effect before reaching the mold cavities. That congeals the material prematurely, impedes mold charging and often causes flaws in the molded product. Upon completion of the molding operation the reciprocable die abutment member is retracted to open the die, and the molded articles, together with the sprue which has been molded thereto in the runner channels, are ejected as a unit.

In order to eliminate the said premature chilling effect upon the injected material and also eliminate the production of sprue connecting the molded articles the present invention provides an injection head designed for multiple injection directly into individual mold gates for the different mold cavities. This injection head is designed for installation in a standard form of injection molding machine with minimum alteration or adjustment of the machine.

In Fig. 1 there are indicated the reciprocable abutment plate and the resistance abutment plate, designated 1 and 2 respectively. Plate 1 bears a molding die D. A companion die D' is borne by the injection head, as will be explained hereinafter. Fig. 1 also shows the forward end of an injector I. This may be of a conventional form including a heated cylinder 3 bearing an injection nozzle 4 at its forward end, and an injection plunger reciprocable in the bore of the cylinder. The operating means for the plunger, and the mounting for the injector are omitted in order to simplify the illustration. For the same reason the mounting for the plates 1 and 2 and the mechanism for reciprocating plate 1 are omitted. The injector is supported in axial alinement with a central horizontal bore 5 in the plate 2 and with the injection nozzle 4 approximately at the rear end of said bore.

The injection head comprises a plate-like metal body 6 whose major portion 7 is circular or cylindrical and formed integrally with a flat base 8 of square or rectangular contour. At its rear face the body is integrally formed with a cylindrical protuberance 9 whose diameter is materially less than that of the bore 5 in plate 2. The body is mounted upon said plate with its base 8 abutting the forward face of the plate, and the protuberance 9 projecting through the bore of the plate. Holes 10 in the base receive screws or bolts 10ª to secure the body detachably to the plate 2. At its forward face the body bears flat, concentric metal rings 11 detachably secured to the body by screws 12. The forward faces of these rings are in a plane parallel to the forward face of plate 2 and they form abutments for the rear face of the die D'.

An inlet bore 13 for injected material leads from the rear end of the protuberance 9 axially inward therethrough to a midpoint in the thickness of the plate-like body. There said bore is flared and enlarged, as at 14. The rear end of the bore is formed to fit the discharge end of the injection nozzle 4. From the said enlarged portion 14 of the bore a number of branch bores 15 radiate and extend clear to the periphery of the cylindrical portion 7 of the body. In the present instance there are six of the branch bores equally spaced around the inlet bore. The inner end portion of each tapers toward the inlet bore, as at 16, for a purpose which will appear hereinafter. An outer length portion is enlarged or counterbored as at 17, and partly screw-threaded as at 18. The bottom 19 of each counterbore tapers inward. A series of outlet bores 20 lead from the branch bores at points spaced inward from the counterbores and extend to the forward face of the body. In the present instance the bores 6 are all located on a circle around the axis of the inlet bore. The branch bores are all in the same plane within the body, at right angles to the inlet bore. Within said plane the body is also formed with radiating bores 21 midway between the branch bores and leading from the periphery of the cylindrical portion of the body inward to points short of the inlet bore and the branch bore. The body also has a bore 22 of small diameter leading inward from said periphery. This bore is parallel to one of the branch bores and close to it.

As shown in Figs. 1 and 2, the outer end of each branch bore 15 is closed by a plug 23. The latter is threaded, as at 24, for screw engagement with the thread 18 and has a reduced pilot end portion and a tapered or beveled shoulder 25 to seat upon the tapered bottom 19 of the counterbore and close the bore 15 at that point. The outer end of the plug is squared to receive a wrench. At the forward face of the body there are a number of injection nozzles 26. As shown in Figs. 1 and 2 there are six nozzles, one for each outlet bore 20. Each nozzle has a cylindrical shank 27 fitted tightly in the respective bore 20, a cylindrical head 28 abutting the margin of said bore and a rounded nipple 29 on the head. The bore of the nozzle is restricted for most of its length but flared at its inner end. At opposite sides the head has tapered undercuts 30 to receive wedge-shaped prongs of a drift tool, not shown, for forcing the shank of the nozzle out of the bore 20.

The body of the injection head also has a central bore 31 preferably larger than the bores 21, and leading from the forward end of the inlet bore 13 to the forward face of the body. In Figs. 1 and 2 bore 31 is closed by a plug 32 having a shank fitting tightly in the bore, and a head abutting the outer margin of the bore. The head of the plug has a flat outer face in the same plane as the outer faces of the abutment rings 12 so that the head forms another abutment for the die D'. The head has tapered undercuts 30 similar to those of the nozzles, for removal of the plug.

Within each bore 21 there is fitted an electrical heating unit 33 of a cartridge type. Within the slender bore 22 there is fitted a thermocouple 34 for connection to means, not shown, for controlling the supply of current to the heating units. A heating unit 35 surrounds the body protuberance 9, leaving a surrounding space within the bore 5 which is packed with material 36 for heat insulation. The rear face of the body 6 is recessed for the greater portion of its area, as at 37, and the recesses are also packed with material 38 for heat insulation. Around said recesses the body firmly abuts the plate 2. The said insulating material materially reduces conduction of heat from the injection head to the plate 2.

The die D' may be supported on the injection head by pins 39 anchored, as by screw threads, to the body of the injection head, projecting forward through bores in the head, and headed at their outer ends for engagement with abutments 39ª in the die D'. The length of said pins between their heads and the abutments 11 exceeds the spacing of the abutments 39ª from the rear face of the die to permit of slight separation of the die from abutments 11 when the plate 1 is retracted for opening the mold. This separation draws the die away from the nozzles 26. In order to ensure the separation compression springs 40 surrounding the pins act to force the die away from abutments 11 as the mold is opened.

The dies D and D' are formed to define a number of mold cavities corresponding to the number of injection nozzles 26 on the injection head. The die D' has mold gates or charging ports 41, one for each cavity, and each alining with one of the nozzles and having a rounded entrance to fit the nipple of the nozzle.

By advance of the die plate or head 1 toward the plate 2 the die D is first brought into contact with the die D' to close the mold. Then, by continued advance of the plate 1, both dies are advanced, against the resistance of springs 40, until the die D' bears against the abutments on the injection head and the nipples of the injection nozzles are seated in the entrances of the mold gates. Then the plunger of the injector I is operated to forcibly inject thermoplastic material through the inlet bore 13 and thence into the radiating branch bores 15. The latter distribute the material to all of the injection nozzles 26 for injection straight through the short mold gates 41 and into the mold gates. After the material has set sufficiently in the chilled mold cavities the die plate 1 is retracted for opening the mold and causing the die D' to separate from the nozzles 26, under the influence of the springs 40. As the mold is opened the molded articles may be ejected from the die D by the usual knock-out mechanism, not shown. The molded articles come out entirely separate from each other and each bearing only the short sprue from its mold gate. Said sprue is cut off and ground up for molding.

By means of the heating units 33 and the heating unit 35 the body of the injection head and the injection passages 13 and 15 therein are kept heated during injection operations and between operations. In an injection operation the thermoplastic material passes from the heated injector I clear to the nozzles 26 through heated passages so that the material has to pass only through the mold gates to reach the mold cavities. That materially reduces impedance to mold charging and assists materially in obtaining a flawless molded product. Material remaining in the bores 13 and 15 of the injection head during the interval between injection is kept heated and in a required plastic condition for the next injection into the mold cavities. As the injection head has its own heating means 33 independent of the heating means for the injection cylinder the temperature of the passages in the injection head may be controlled independently of the cylinder temperature to prevent charring of the material remaining in said passages between injection strokes of the plunger. By distributing the material for charging the various cavities through heated channels located entirely outside of the mold dies, the molding of the aforesaid connecting sprues is avoided. By location of the thermocouple 34 quite close to one of the passages 15 it is rendered quickly responsive to temperature changes in said passage and enabled to accurately govern the supply of current to the heating units in accordance with the heat requirements in all of the passages. The bores 15 are equally heated so that the thermocouple need respond to temperature changes in only one of them.

There is provision for adjusting the injection head to vary the number of points of injection in accordance with the number of mold cavities to be charged. In Figs. 1 and 2 the injection head is adjusted for injection from its maximum number of injection points. Injection from any one of the points may be eliminated by removing the nozzle 26 at that point, removing the plug 23 from the delivery bore 15 for said nozzle and inserting into said bore a long plug 42 to close said bore 15 at its juncture with the inlet bore 13, as shown in Fig. 3. The outer length of said long plug is formed similarly to the plugs 23. It has a head for wrench engagement, a screw thread 24 for screwing into the thread 18, and a long slender shank 42 to extend through the bore 15. At its inner end said shank is tapered, as at 43, to fit in the tapered end 16 of the bore and plug it. In Fig. 3 the injection head is shown adjusted for central injection. For that purpose all of the branch bores 15 may be plugged and their connecting nozzles removed. The central plug 32 is removed and a nozzle 44, similar to the nozzles 26, has its shank fitted in the central bore 31 for direct forward injection from the inlet bore 13. The injection head is thus readily adjustable in accordance with the number of mold cavities to be charged or the number of gates with which the mold is provided.

The injection head is a unit designed and mounted for removal and replacement bodily independently of the injection cylinder 3 and its nozzle. For removal of said unit the abutment plate 1 is retracted and the screws 10ᵃ are withdrawn to release the unit from the abutment plate 2. The unit may then be pulled forward, away from the injection nozzle 4, to withdraw the protuberance 9 from the bore 3, so that the unit may be lifted from the machine. If required, either before or after the removal of the unit, the die D' may be released from the unit by unscrewing the pins 39.

While I have disclosed a very satisfactory form of my injection device it is capable of modification without departing from the invention as defined in the appended claims.

What I claim is:

1. An injection head for an injection molding machine, comprising a plate-like body having a number of bores including a central inlet bore opening through the rear face of the body to receive a forcibly injected charge of moldable material, branch bores radiating from said inlet bore, and bores extending inward from the outer edge of the body and located between said branch bores; injection nozzles borne by said body at the front face thereof and in receiving communication with said branch bores at points spaced outward from the inlet bore for injection into a plurality of mold gates; and heating means in said bores between the branch bores.

2. An injection head according to claim 1, characterized in that said body also has an additional bore extending inward from the outer edge thereof and close to one of the said branch bores; and there is a thermocouple in said additional bore, for the purpose set forth.

3. An injection head for interposition between a resistance abutment and a molding die assembly in an injection molding machine, comprising a plate-like body formed with a central protuberance at its rear face and formed also with a plurality of bores including an inlet bore extending inward from the outer end of said protuberance to receive a forcibly injected charge of moldable material, branch bores radiating from said inlet bore, and radiating bores located between the branch bores; injection nozzles borne by said body and in receiving communication with the branch bores at points spaced outward from the inlet bore, for injection into a plurality of mold gates; electrical heating units fitted in said radiating bores between the branch bores; and heating means surrounding the said protuberance.

4. An injection head for interposition between a resistance abutment and a molding die assembly in an injection molding machine, comprising a plate-like body formed with a central protuberance at its rear face and formed also with a plurality of bores including an inlet bore extending inward from the outer end of said protuberance to receive a forcibly injected charge of moldable material, branch bores radiating from said inlet bore and extending to the outer edge of the plate-like body, and tapering toward the inlet bore at their juncture therewith, for the purpose set forth, outlet bores leading forwardly from said branch bores at points spaced outward from the inlet bore and opening through the forward face of the body, radiating bores shorter than the branch bores located between the latter and extending inward from the outer edge of the body, and a central discharge bore alining with the inlet bore and extending therefrom to the forward face of the body; injection nozzles having shanks removably fitted in said outlet bores leading from the branch for injection into a plurality of mold gates; removable plugs closing the outer ends of the branch bores; a removable plug for closing said central discharge bore and replaceable by an injection nozzle; electrical heating units fitted in said shorter radiating bores; and heating means surrounding the said protuberance.

5. An injection head for an injection molding machine, comprising a plate-like body having a number of bores including a central bore opening through the rear face of the body to receive a forcibly injected charge of moldable material and branch bores radiating from said inlet bore; injection nozzles borne by said body at the front face thereof and in receiving communication with said branch bores at points spaced outward from the inlet bore for injection into a plurality of mold gates, the branch bores extending to the outer edge of the body and their inner end portions tapering toward the inlet bore, for the purpose set forth; and removable plugs for closing the outer ends of the branch bores.

6. An injection head for an injection molding machine, comprising a body, a plurality of spaced injection nozzles borne by said body for injection into a plurality of mold gates, said body being formed with an inlet to receive a forcibly injected charge of moldable material and with delivery passages connecting said inlet to said nozzles to distribute the charge for injection by the nozzles, said delivery passages extending past the nozzles to the exterior of the body; and removable plugs for closing the outer ends of said passages, the passages tapering for a portion of their length between said inlet and the nozzles to receive other plugs insertable through the outer ends of said passages after removal of the first plugs.

7. An injection molding machine having an injection cylinder with a discharge nozzle at its forward end, injection thrust means for expelling a charge of molded material from the cylinder through said nozzle, a resistance abutment plate adjacent the forward end of said cylinder and formed with an aperture therethrough in axial alinement with said discharge nozzle, an injection head detachably connected to the forward face of said abutment plate and comprising a plate-like body formed with a protuberance at its rear face extending through the aperture in the abutment plate and contacting the cylinder nozzle, and with a forwardly extending cylindrical body part, said protuberance being formed with an inlet aperture in axial alinement with the nozzle axis and the cylindrical body part being formed with branch bores radiating from said inlet bore and extending through the margin of said cylindrical body part and communicating at their inner ends with the said inlet passage, injection nozzles borne by the said body at the front face thereof and in receiving communication with said branch bores at points spaced equal distances outward from the inlet bore for injection into a plurality of mold gates, a molding die secured to the forward face of the injection head and formed with apertures in register with the apertures of the said injection nozzles, a rigid thrust transmitting spacer between the injection head and the molding die, and removable plugs for closing the branch bores, said plugs being accessible around the periphery of the said cylindrical body part of the injection head.

8. An injection molding machine having an injection cylinder with a discharge nozzle at its forward end, injection thrust means for expelling a charge of molded material from the cylinder through said nozzle, a resistance abutment plate adjacent the forward end of said cylinder and formed with an aperture therethrough in axial alinement with said cylinder discharge nozzle, an injection head detachably connected to the forward face of said abutment plate and comprising a plate-like body formed with a protuberance at its rear face extending through the aperture in the abutment plate and contacting the cylinder nozzle, said protuberance being formed with an inlet aperture in axial alinement with the said cylinder discharge nozzle axis and the body part being formed with branch bores extending through the margins of said body part and communicating at their inner ends with the said inlet passage, injection nozzles borne by the said body at the front face thereof and in receiving communication with said branch bores at points spaced outward from the inlet bore for injection into a plurality of mold gates, a molding die secured to the forward face of the injection head and formed with apertures in register with the apertures of the said injection nozzles, and removable plugs for closing the branch bores, said plugs being accessible around the margin of the body part of the injection head.

9. An injection head for interposition between a resistance abutment and a molding die assembly in an injection molding machine, comprising a plate-like body formed with a central protuberance at its rear face and formed also with a plurality of bores including an inlet bore extending inward from the outer end of said protuberance to receive a forcibly injected charge of moldable material, branch bores radiating from said inlet bore and extending to the outer edge of the plate-like body and tapering toward the inlet bore at their juncture therewith, for the purpose set forth, outlet bores leading forwardly from said branch bores at points spaced outward from the inlet bore and opening through the forward face of the body, and a central discharge bore aligning with the inlet bore and extending therefrom to the forward face of the body; injection nozzles having shanks removably fitted in said outlet bores leading from the branch bores for injection into a plurality of mold gates; removable plugs closing the outer ends of the branch bores; and a removable plug for closing said central discharge bore and replaceable by an injection nozzle.

10. An injection head for an injection molding machine, comprising a plate-like body having a number of bores including a central bore opening through the rear face of the body to receive a forcibly injected charge of moldable material and branch bores radiating from said inlet bore; injection nozzles borne by said body at the front face thereof and in receiving communication with said branch bores at points spaced outward from the inlet bore for injection into a plurality of mold gates, the branch bores extending to the outer edge of the body, and removable plugs for closing the outer ends of the branch bores.

EDWARD R. KNOWLES.